United States Patent
Mercer et al.

(10) Patent No.: US 10,837,601 B2
(45) Date of Patent: Nov. 17, 2020

(54) SUBTERRANEAN GAS STORAGE ASSEMBLY

(71) Applicants: Ronald R. Mercer, Nichols Hills, OK (US); Michael Douglas Mercer, Edmond, OK (US)

(72) Inventors: Ronald R. Mercer, Nichols Hills, OK (US); Michael Douglas Mercer, Edmond, OK (US)

( * ) Notice: Subject to any disclaimer, the term of this patent is extended or adjusted under 35 U.S.C. 154(b) by 0 days.

(21) Appl. No.: 16/661,406

(22) Filed: Oct. 23, 2019

(65) Prior Publication Data

US 2020/0132250 A1 Apr. 30, 2020

Related U.S. Application Data

(60) Provisional application No. 62/752,041, filed on Oct. 29, 2018.

(51) Int. Cl.
*B65G 5/00* (2006.01)
*F17C 1/00* (2006.01)

(52) U.S. Cl.
CPC .............. *F17C 1/007* (2013.01); *B65G 5/00* (2013.01); *F17C 2201/0119* (2013.01); *F17C 2201/032* (2013.01); *F17C 2205/013* (2013.01); *F17C 2205/0323* (2013.01); *F17C 2205/0338* (2013.01); *F17C 2205/0394* (2013.01); *F17C 2221/032* (2013.01); *F17C 2270/0142* (2013.01)

(58) Field of Classification Search
CPC ...... F17C 1/007; F17C 2201/01; F17C 3/005; B65G 5/00
See application file for complete search history.

(56) References Cited

U.S. PATENT DOCUMENTS

| | | | |
|---|---|---|---|
| 2,066,517 A | 1/1937 | Campbell | |
| 2,332,462 A | 10/1943 | Nilson | |
| 3,196,622 A * | 7/1965 | Smith | F17C 3/005 |
| | | | 62/53.1 |
| 3,196,952 A * | 7/1965 | Solum | E21B 17/1028 |
| | | | 166/241.7 |
| 3,205,685 A | 9/1965 | Van Horn | |
| 3,329,447 A * | 7/1967 | Hitz | F16L 17/06 |
| | | | 285/113 |
| 3,352,116 A | 11/1967 | Waterman | |
| 4,417,829 A | 11/1983 | Berezoutzky | |
| 4,639,164 A | 1/1987 | Pugnale et al. | |
| 4,639,920 A | 1/1987 | Kaneko | |
| 4,676,528 A * | 6/1987 | Gray | E21B 17/0423 |
| | | | 285/15 |
| 4,805,445 A * | 2/1989 | Grappe | G01M 3/32 |
| | | | 73/49.2 |
| 4,805,674 A | 2/1989 | Knowlton | |

(Continued)

FOREIGN PATENT DOCUMENTS

DE 69505802 T2 4/1999
EP 1435481 A1 7/2004

*Primary Examiner* — Sean D Andrish
(74) *Attorney, Agent, or Firm* — Hall Estill Attorneys at Law; Tyler J. Mantooth

(57) ABSTRACT

Various embodiments are generally directed to a unit secured in a single subterranean bore. The unit can be configured to store compressed hydrocarbon gas in at least one of a plurality of separate vessels that are respectively attached via at least one retainer. An anchor feature may be employed to center the unit within the single subterranean bore.

18 Claims, 7 Drawing Sheets

(56) References Cited

U.S. PATENT DOCUMENTS

| | | | |
|---|---|---|---|
| 5,207,530 A * | 5/1993 | Brooks | F17C 1/007 |
| | | | 405/53 |
| 5,333,465 A | 8/1994 | McBride | |
| 6,209,638 B1 * | 4/2001 | Mikolajczyk | E21B 17/1028 |
| | | | 166/241.1 |
| 6,637,976 B2 | 10/2003 | Stanton | |
| 6,840,709 B2 | 1/2005 | Dahlem et al. | |
| 9,109,751 B2 | 8/2015 | Schimp | |
| 9,127,812 B2 | 9/2015 | Ronchieri | |
| 9,896,269 B2 | 2/2018 | Williams et al. | |
| 10,337,669 B2 | 7/2019 | Mercer et al. | |
| 2008/0131258 A1 | 6/2008 | Liepold et al. | |
| 2011/0155469 A1 * | 6/2011 | Sanfelice | E21B 7/061 |
| | | | 175/62 |
| 2012/0104008 A1 * | 5/2012 | DeNardo | F17C 1/007 |
| | | | 220/694 |
| 2013/0336721 A1 | 12/2013 | McBride | |
| 2014/0161533 A1 | 6/2014 | Oates | |
| 2015/0330569 A1 | 11/2015 | Fitzpatrick | |

* cited by examiner

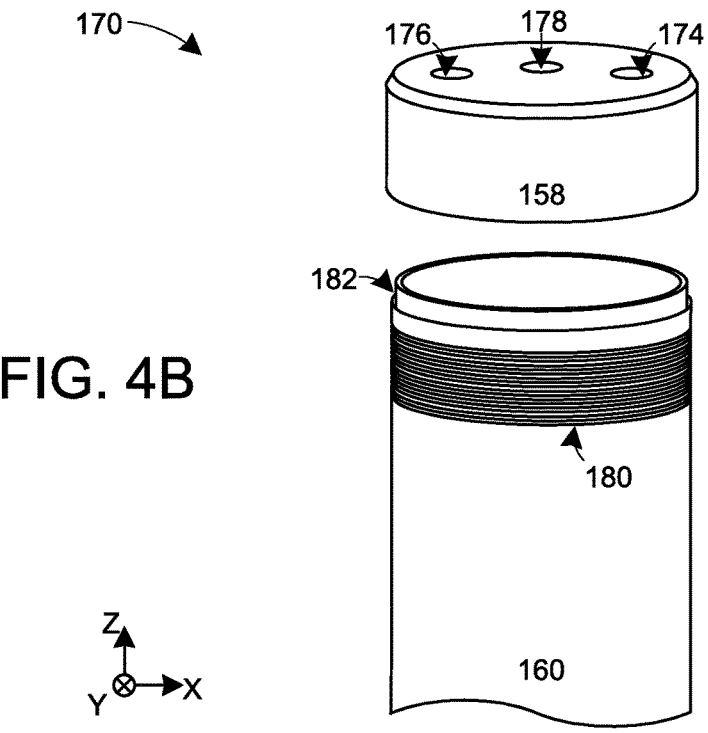
FIG. 4B
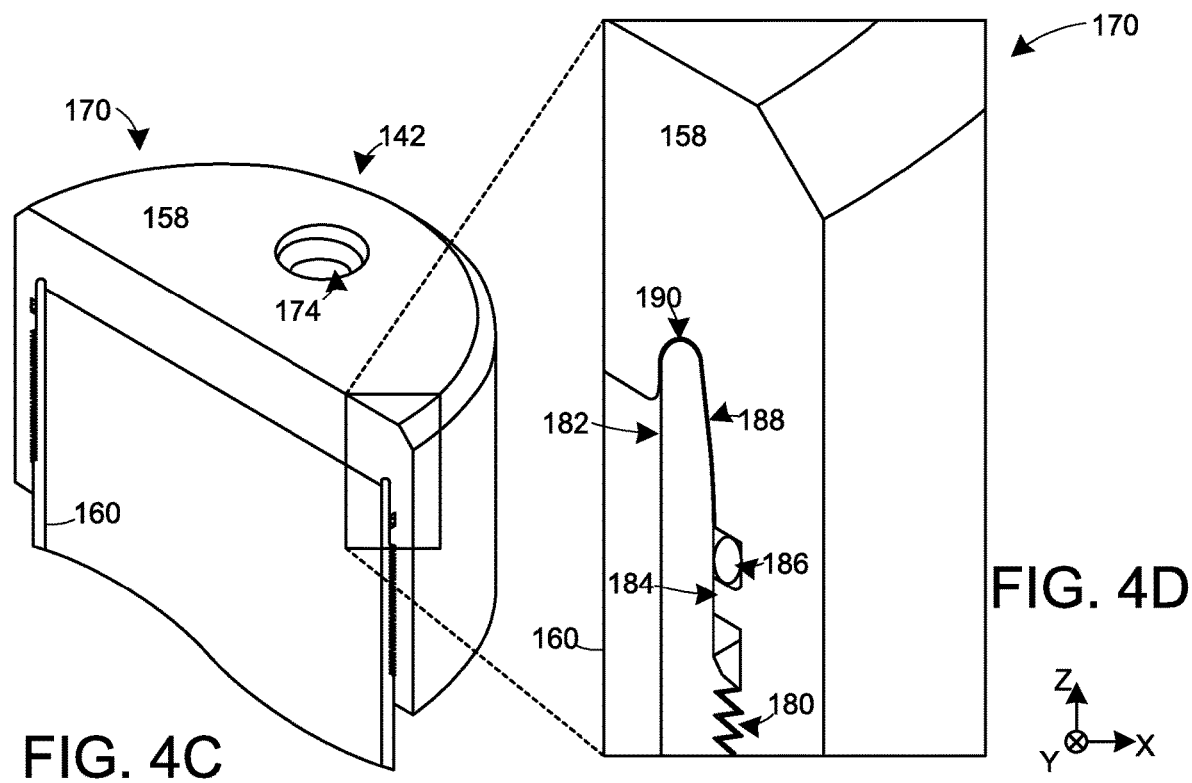
FIG. 4C
FIG. 4D

SUBTERRANEAN GAS STORAGE ASSEMBLY

RELATED APPLICATION

The present application makes a claim of domestic priority to U.S. Provisional Patent Application No. 62/752,041 filed Oct. 29, 2018, the contents of which are hereby incorporated by reference.

SUMMARY

Gas may be stored in a subterranean assembly configured, in some embodiments with a unit secured in a single subterranean bore. The unit has a plurality of separate vessels attached via at least one retainer.

In other embodiments, an anchor feature is connected to a unit in a single subterranean bore. The unit consists of a plurality of separate vessels attached via at least one retainer and the anchor feature consists of a self-centering bow-spring.

Various embodiments arrange a subterranean gas storage assembly with a unit secured in a single subterranean bore and consisting of a plurality of separate vessels attached via at least one retainer. Each vessel of the plurality of separate vessels is arranged with an inlet check valve and an outlet check valve.

BRIEF DESCRIPTION OF THE DRAWINGS

FIGS. 4A-4D respectively illustrate portions of an example subterranean gas storage assembly that can be utilized in accordance with various embodiments.

DETAILED DESCRIPTION

General embodiments of the present disclosure are directed to an assembly for storing compressed gas underground with optimized integration, safety, and reliability.

As the number of machines fueled by gas, such a natural gas and propane, increase, the volume of gas to be delivered grows. The storage of large volumes of compressed, combustible gas above ground can be hazardous, expensive, and cumbersome. That is, above ground storage vessels are required to be constructed of robust materials that are costly, difficult to construct and move, and limiting to the volume of gas that can be stored. As such, there is an industry and consumer interest in storing compressed, combustible gas underground to effectively mitigate the cost and space utilized by above ground gas storage means.

Accordingly, a subterranean gas storage assembly can be utilized with structural and functional embodiments that optimize installation, safety, and operation. For instance, a subterranean gas storage assembly can have a plurality of separate vessels physically connected within a single subterranean bore with a centering feature aligning a longitudinal axis of each vessel with a longitudinal axis of the bore. The centering feature ensures proper vessel placement within the bore during installation and decreases the risk of containment and/or a breach from the bore in the event of a vessel rupture or leak. By positioning multiple vessels in a single bore, as opposed to a single vessel in a bore, a gas volume can be stored in a shallower bore with greater safety and easier installation. The presence of multiple separate vessels additionally provides gas storage options that can be customizable to a diverse variety of environments.

Figure 1:
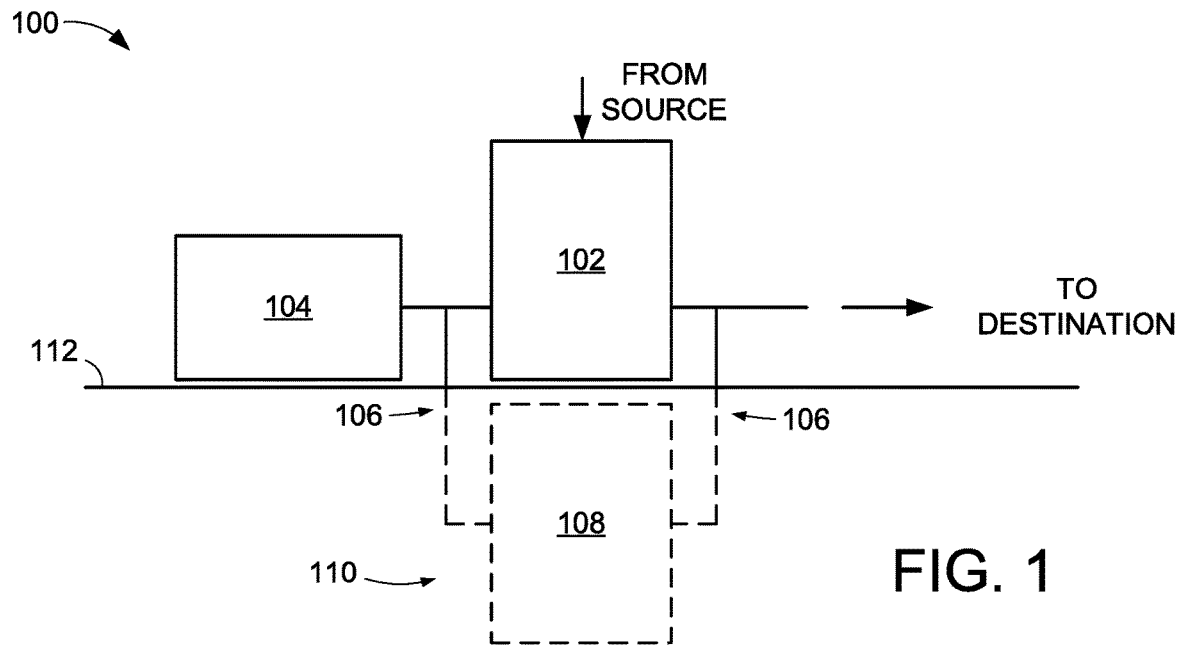
FIG. 1 displays a block representation of an example hydrocarbon storage system in which various embodiments may be practiced.

Turning to the drawings, FIG. 1 conveys portions of an example hydrocarbon storage system 100 in which various embodiments of the present disclosure can be practiced. One or more hydrocarbon sources can feed at least one sealed storage vessel 102 with gas, gas liquids, liquid, or a combination of hydrocarbons in different phases. A compressor 104, or other pressure regulating equipment, can control the pressure, and volume, of hydrocarbons held within the vessel 102 via sealed interconnections 106. At some selected time, the interconnections 106 can be used to supply pressurized hydrocarbons from the vessel 102 to one or more destinations, such as via one or more valves, traps, or meters.

Although the hydrocarbon storage system 100 can be utilized with the vessel(s) 102 positioned anywhere, some embodiments employ at least one underground vessel 108 positioned wholly, or partially, in a subterranean region 110 defined by being below a ground level 112. As shown, but not required or limiting, the interconnections 106 can be configured to concurrently employ vessels 102/108 positioned above ground 112 and below ground 112. The use of above ground vessels 102 can be efficient to install, but can be plagued by high cost to construct and occupying land that could otherwise be used for other purposes. Also, an above ground vessel 102 can pose a safety hazard due to the risk of unwanted evacuation of hydrocarbons or detonation with malice intent.

Figure 2:
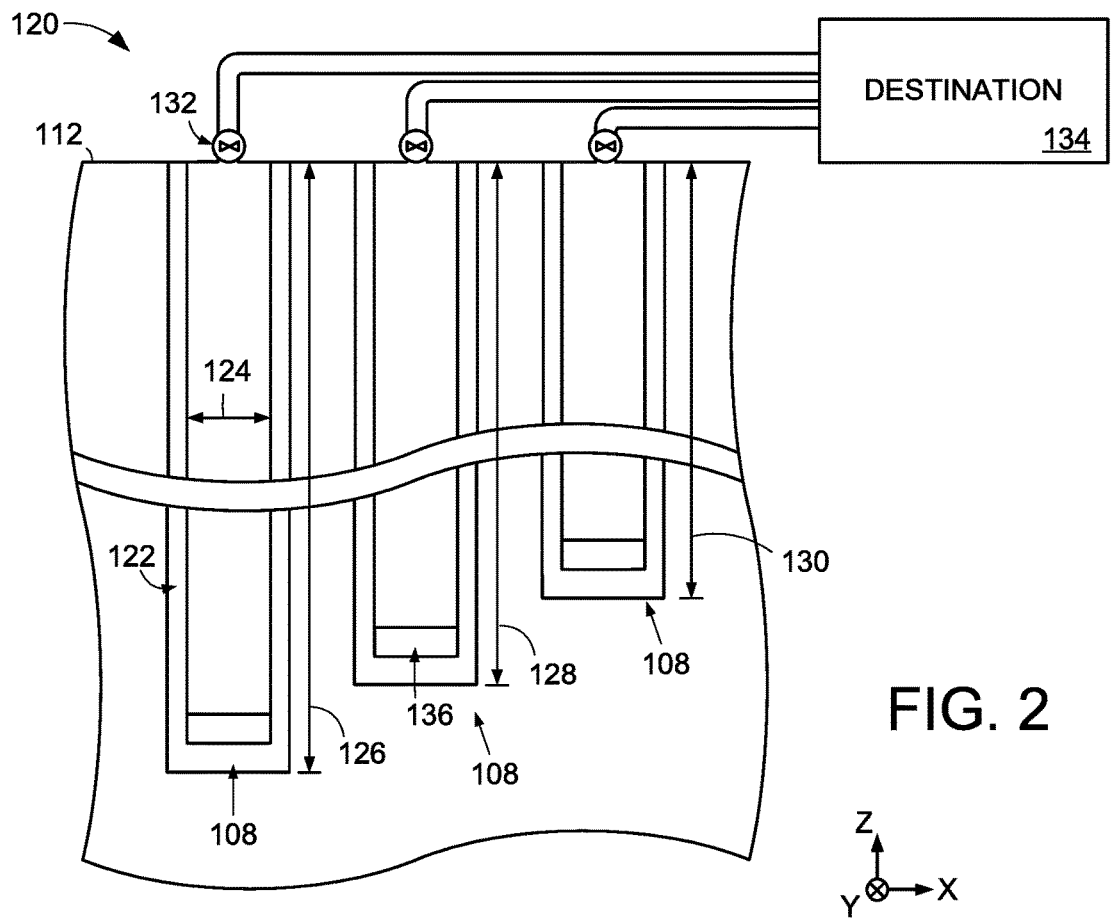
FIG. 2 is a representation of portions of an example subterranean hydrocarbon storage system arranged in accordance with some embodiments.

Hence, interest has turned towards subterranean vessels 108 storing hydrocarbons to provide reduced safety risk and more efficient use of land. FIG. 2 illustrates portions of an example subterranean hydrocarbon storage system 120 that employs multiple separate subterranean vessels 108 in accordance with assorted embodiments. Each vessel 108 is wholly positioned below grade of ground level 112 in physically separate bores 122. It is contemplated that each vessel 108 is secured in-place by concrete, or other filling material, that occupies the portions of the bore 122 not occupied by the vessel 108.

The utilization of separate vessels 108 allows for different storage configurations, such as different vessel widths 124, different depths 126/128/130 below ground level 112, and different storage pressures. Such different configurations can be controlled by one or more pressure regulating equipment 104 and one or more valves 132 that direct stored hydrocarbons to one or more destinations 134. The ability to customize different vessels 108 in respective bores 122 can efficiently service diverse varieties of hydrocarbon servicing environments, but can pose high installation and service costs compared to above ground storage vessels 102. The use of separated subterranean vessels 108 can also pose safety concerns as moisture 136 accumulates in the bottom of the vessel 108 or an inadvertent leak within a bore 122 causes the vessel 108 to exit the bore 122 like a rocket.

Figure 3:
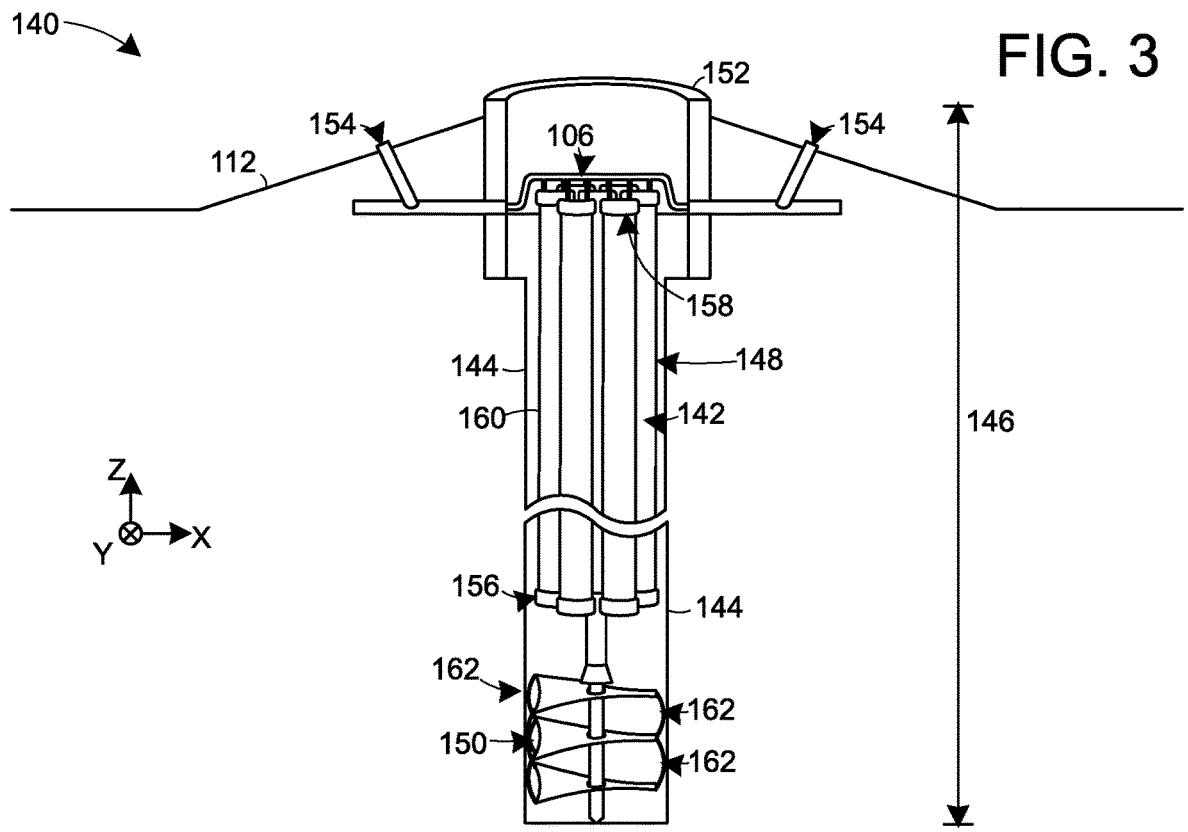
FIG. 3 conveys a line representation of portions of any example subterranean gas storage assembly configured in accordance with assorted embodiments.

With these issues in mind, embodiments of this disclosure are directed to a subterranean hydrocarbon gas storage within a single underground bore that provides greater safety, reduced installation cost, and lower servicing cost along with customization and above ground land use efficiency. FIG. 3 displays a line representation of an example subterranean gas storage assembly 140 configured and operated in accordance with some embodiments. A plurality of independent storage vessels 142 are each positioned in a single bore 144 that continuously extends from ground level 112 to a depth 146 into one or more underground strata. The depth 146 can be measured from the top of the respective vessels 142 or from the ground level 112, if the ground is raised above the height of the vessels 142, as shown.

The respective vessels 142 are packaged collectively into a unit 148 where the longitudinal axis of each vessel 142 is parallel to the longitudinal axis of the bore 144, and the Z axis. Other unit orientations, such as 45 degrees relative to the X axis, are contemplated, but not required. The unit 148 is attached to an anchor feature 150 proximal the bore depth 146. It is contemplated that more than one anchor feature 150 is utilized at different regions of the bore 144, such as proximal the ground level 112. The packaged vessel unit 148 is secured within the bore 144 with cement, or other hardened material, that concurrently contacts the unit 148 and the sidewall of the bore 144. As shown, but not required, a protective collar 152 can partially, or completely, surround a portion of the unit 148 proximal the ground level 112, which protects the interconnections 106 of each vessel 142 to an above ground tap 154.

In a non-limiting embodiment, each unit 148 consists of 7 joints of 13⅜" P110 casing. Each vessel 142 is designed to have a working pressure of 4500 psi, which corresponds with approximately 75,000 cfg of natural gas storage for the unit 148. The bore 144 may be 48" or 54" to provide the efficient packing of 13⅜" casing, which is the largest size that can routinely handle 4500 psi. The ends of each vessel 142 are sealed with a bottom cap 156 and a top cap 158 positioned on opposite sides. Also, the ends of the vessels 142 are machined in a manner to mate with the respective caps 156/158. The sealing strategy for each vessel 142 consists of a metal-to-metal seat as well as an elastomer seal. Each cap 156/158 may also be threaded onto the casing body 160, which complements the metal-to-metal seat and elastomer seal.

The vertical orientation of the unit 148 means that a large quantity of gas can be stored in a very small footprint, such as 75,000 cfg in a space occupying a 5 ft. in diameter bore 144. The reduced ground level 112 exposure makes the assembly 140 much less vulnerable to external trauma. In fact, the unit 148 is configured to withstand with the total destruction of surface interconnections 106 and distribution systems without releasing stored gas because all safety valves are internal and contained within the respective vessels 142. Further, in the event of a catastrophic release do to vandalism or terrorism, the gas or blast is directed vertically minimizing the impact to surrounding ground level structures.

The assembly 140 may be constructed using a caisson driller to cut a 48" or 52" bore 144 is dug to approximately 50 feet below ground level 112. After the dirt is cleared away, a 60" precast concrete ring can be centered over the bore. The anchor feature 150 self-centers as it is lowered into the bore 144 using a running tool which pushes it to bottom. The anchor feature 150 is then cemented in place leaving a stump sticking up approximately 2' out of the concrete, proximal the bottom of the bore 144.

The running tool is centered in the bore 144 to ensure the anchor feature 150 is straight and the unit 148 will also be centered. The running tool is left attached during cementing to ensure the latching mechanism is kept clean and free of concrete. The running tool is then unlatched and removed after the cement sets. The anchor feature 150 is held in place by centering bow springs 162. Once the cement has set, an anchoring sub is threaded on to a special cap located on the bottom center of the unit 148.

Next, a circular plate can be positioned over the sub and attached to the star spacer of the unit 148 that attaches the various vessels 142 together, which serves to anchor the assorted vessels 142 they won't float while cementing. Finally, an overshot will be attached to the anchor sub, such as with a threaded connection or crossover, it over the stump of the anchor feature 150. The unit 148 can then be raised, oriented, and lowered into the caisson bore 144. The overshot will slide over the stump of the anchor as the unit 148 is lowered to the desired depth 146. Then the overshot will be set to anchor the unit 148 for cementing while leaving enough room below the surface caps 158 so that they may be serviced later, if needed.

It is noted that the unit 148 will float in liquid concrete and the cemented anchor feature 150 ensures the unit 148 stays lowered in the concrete, and centered in the bore 144. Once the cement has set, the individual vessels 142 may be plumbed and interconnections 106 are run through service ports drilled on each side of the precast concrete collar 152. The dirt from the bore 144 can be piled up around the collar 152 to provide an additional blast barrier or barrier to flying debris, such as in a tornado or hurricane.

Figure 4A:
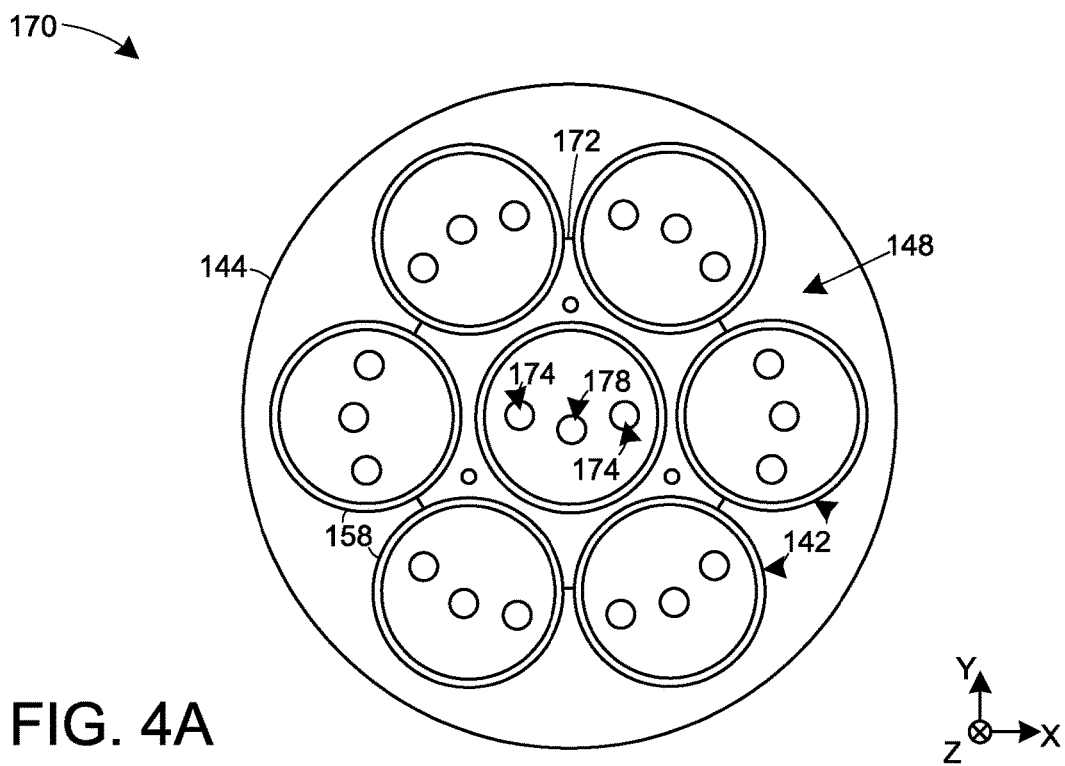

FIGS. 4A-4C respectively show portions of an example subterranean gas storage assembly 170 that is arranged in accordance with some embodiments. FIG. 4A is a top view of an example unit 148 positioned within a single bore 144. One or more retainers 172 can concurrently contact, and attach, the respective vessels 142 to create a physically unitary package. A retainer 172 may be constructed of any rigid, or flexible, material that physically contacts the vessels 142 in a manner that promotes unit 148 rigidity. It is contemplated that a retainer 172 is constructed of a dampening material, such as rubber, that reduces vessel 142 vibration and movement during installation in the bore 144.

It is noted that seven vessels 142 are arranged into the unit 148 in FIG. 4A, but such configuration is not limiting as more, or less, vessels 142 can be packaged together in a single bore 144 with one or more retainers 172. Regardless of the number of vessels 142 in a unit 148 positioned in a subterranean bore 144, each vessel 142 is tapped with at least one inlet hole 174 and one outlet hole 176. In accordance with some embodiments, a center hole 178 is drilled slightly off center in order to give an orientation to the cap 158 that allows the type of internal valve to be identified externally and without removing the cap 158 from the body 160. That is, at least one hole 178 in the cap 158 is offset a predetermined distance from a centerpoint of the cap in the X-Y plane to align the hole 178 with a valve contained within the vessel 142.

As shown in FIG. 4B, the cap 158 can have a combination mating configuration with the casing body 160 with a threaded connection 180 along with a recessed lip 182. Once fully engaged with the threaded connection 180, the cap 158 contacts the recessed lip 182 concurrently with a metal-to-metal surface seal 184 and an elastomer seal 186, which is illustrated in the cross-sectional views of FIGS. 4C & 4D. The recessed lip 182 may comprise a first linear portion 184 arranged to mate with one or more O-rings 186 that complement a beveled portion 188 that are shaped to fill and contact a channel 190 of the cap 158. By utilizing the combination seals and connections for the cap 158, the vessel 142 can employ relatively high internal pressure without risking safety over time.

Figure 5A:
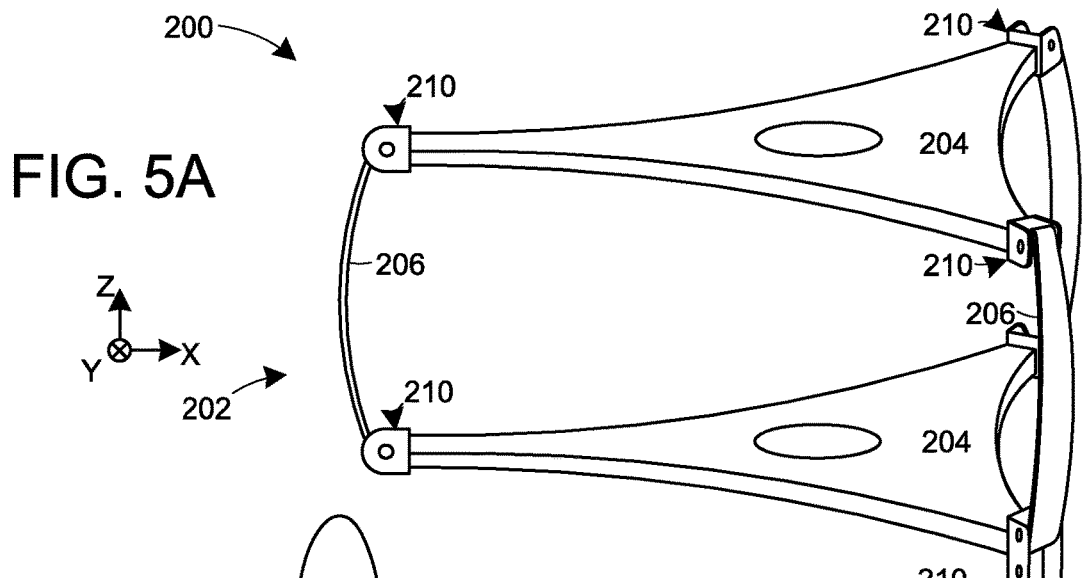
FIGS. 5A-5C respectively depict portions of an example subterranean gas storage assembly arranged in accordance with some embodiments.
Figure 5B:
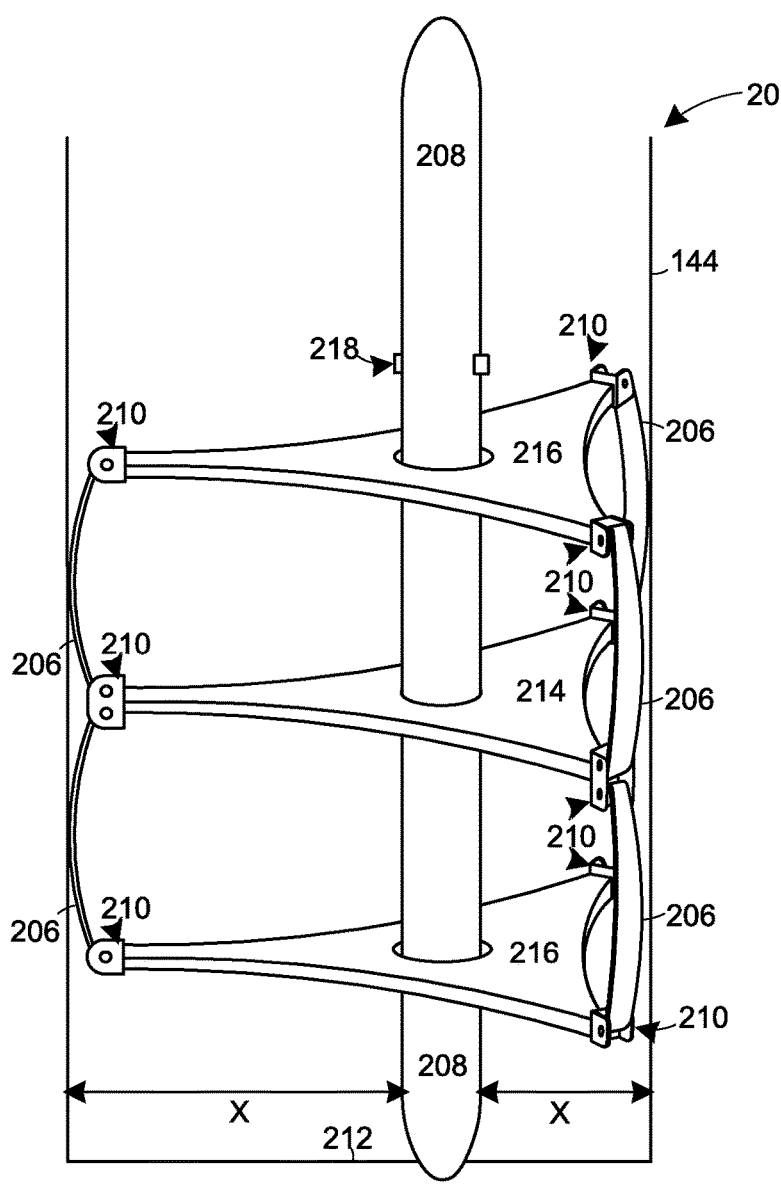
Figure 5C:
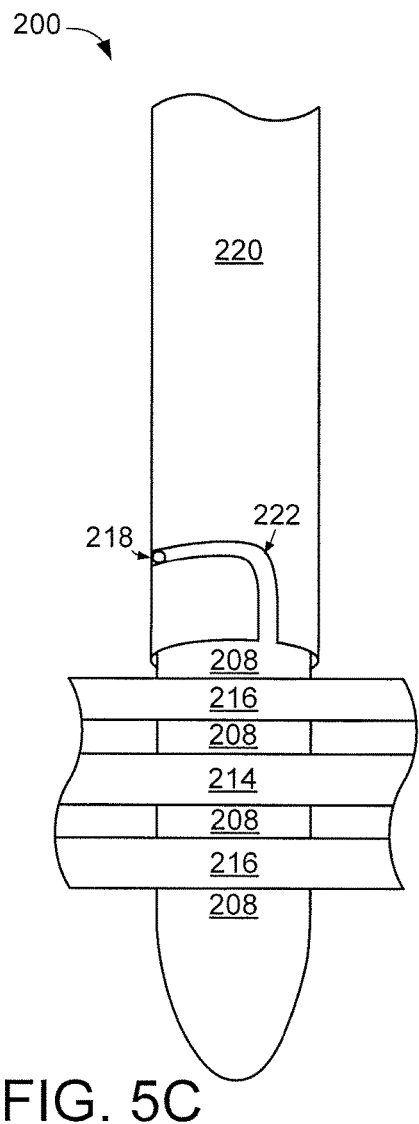

The optimized sealing of a vessel 142 with a top cap 158 is complemented by an anchor feature 150 that secures the vessel 142 at a predetermined depth and orientation within a subterranean bore. FIGS. 5A-5C respectively display portions of an anchor feature 200 that can be employed as part of a subterranean gas storage assembly in some embodiments. FIG. 5A represents a bowspring portion of an anchor feature 200 that functions to center a unit within a bore 144. The bowspring 202 has two or more plates 204 connected by flexible bows 206 that allow at least one plate 204 to move and apply force that positions an anchor pole 208 in the center of the bore 144.

In the non-limiting configuration of FIGS. 5A & 5B, each plate 204 has a matching triangular shape, rigid material, and size. However, it is contemplated that plates 204 with different dimensions and/or materials. Similarly, each bow 206 has a matching shape, size, and material extending between two plates 204. The respective bows 206 may be rigidly attached to the plates 204, such as via a weld or fastener, or can be pivotally attached to separate plates 204 with hinges 210. Such hinges 210 can be configured to allow rotation of a bow 206 in a fixed plane parallel to the X-Z plane. It is contemplated that a hinge 210 can also rotate relative to the plate 206 about the X-Y plane.

FIG. 5B depicts how an anchor feature 200 can be positioned within a bore 144. The anchor pole 208 can have a sharp, pointed, or otherwise penetrating configuration that digs into the floor 212 of the bore 144 while the plates 206 centralize the pole 208 in the bore 144 along the X-Y plane. While each plate 204 can be rigidly attached to the pole 208, various embodiments rigidly attach a central plate 214 to the pole 208 with multiple separate plates 216 positioned proximal the pole 206 without being rigidly attached. That is, each separate plate 216 can surround the pole 206 without being physically connected, which allows the plates 216 to freely rotate around the pole 208 as well as freely move vertically along the Z axis.

The combination of the freely moving plates 216, attached plate 214, and bows 206 ensure the pole 208 is centered within the bore 144 during installation so that the pole 208 contacts the floor 212 in substantially the middle of the bore 144. Each plate 214/216 can be constructed with a width in the X-Y plane that is less than 48", which allows the anchor feature 200 to efficiently travel into the bore 144 without excessive drag. The triangular shape of the plates 214/216 and the connected bows 206 allow the anchor feature 200 to accurately center the pole 208 within the bore 144 by having three points of contact with the sidewall of the bore 144. For instance, the plates 214/216, bows 206, and/or hinges 210 can physically contact the sidewalls of the bore 144 during installation and after the pole 208 is secured to the bore floor 212 to ensure the pole's 208 centralized orientation relative to the bore 144.

The pole 208 can be constructed with one or more installation protrusions 218 that physically attach to an installation tool 220 that lowers the anchor feature 200 into the bore 144. FIG. 5C displays how the anchor feature 200 temporarily connects to an installation tool 220 via keyed interaction of the installation protrusion(s) 218 with a recess, groove, slot, hole, or other receiving aspect 222 of the tool 220. In some embodiments, the keyed tool aspect 222 is constructed to allow vertical (Z axis) and lateral (X-Y plane) control during installation of the anchor feature 200. The keyed tool aspect 222 can be used to maintain the anchor feature 200 in position with the pole 208 being parallel to the longitudinal axis of the bore 144 while the feature 200 is secured in place, such as with cement. Once secured, rotation, or other movement, of the keyed aspect 222 and tool 220 releases the anchor feature 200. It is noted that clockwise rotation that normally tightens connections and releases components. The configuration of the keyed aspect 222 with a left-hand loosen prevents the tool 220 from inadvertently releasing.

Figure 6:
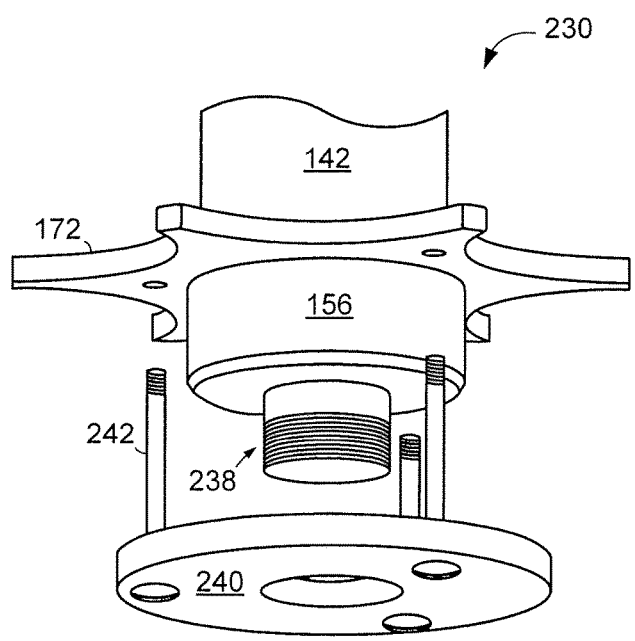
FIG. 6 represents an exploded view of portions of an example subterranean gas storage assembly that can be employed in a gas storage system.
Figure 6:
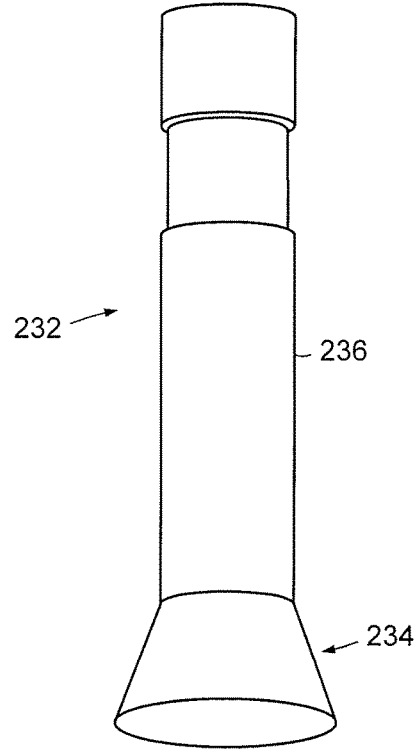

FIG. 6 represents a portion of an example subterranean gas storage assembly 230 arranged in accordance with assorted embodiments. Once an anchor feature has been secured in a centralized position within a bore, a unit 148 can be physically attached. The partially exploded view of FIG. 6 shows a unit foot 232 that connects the unit 148 to an anchor feature. The foot 232 has an overshot portion 234 protruding from a pipe 236 that has a threaded interior to screw onto a threaded nipple 238 of the unit 148. It is contemplated that the threaded nipple 238 is integrated into a vessel bottom cap 156, but such configuration is not required.

A retainer plate 240 is positioned about the pipe 236 and nipple 238 with fasteners 242 that connect to a retainer 172. The securing of the retainer 172 to the plate 240 that is disposed between the pipe 236 and vessel bottom cap 156 ensures a solitary unit 148 with vessels locked in place by the retainer 172. Such unitary construction of the assorted vessels corresponds with reliable installation of the foot 232 to the anchor feature so that the unit 148 is centered within the bore at a predetermined depth. In some embodiments, the overshot 234 is configured with articulating jaws that engage the anchor feature in response to the unit 148 being pulled upward, vertically once the unit 148 is at a desired depth.

With the foot 232 securing the unit 148 in place, the bore is filled with cement, or other filling material, to integrate the unit 148 with the bore. The top of the cement may be arranged to be approximately 12" above ground level in a mound in order to shed water away from the bore. The cement of the bore can be arranged to be below the top caps of the respective vessels of the unit, as shown in FIG. 3. As a result of the efficiency and accuracy of the installation of the anchor feature, foot, and unit, vessel damage, installation cost, and installation time can be reduced. The segmented installation of the gas storage assembly also allows less robust installation equipment to be used, such as a relatively light-duty crane or forklift to lower the anchor feature and unit instead of a heavy-duty, larger crane.

Figure 7A:
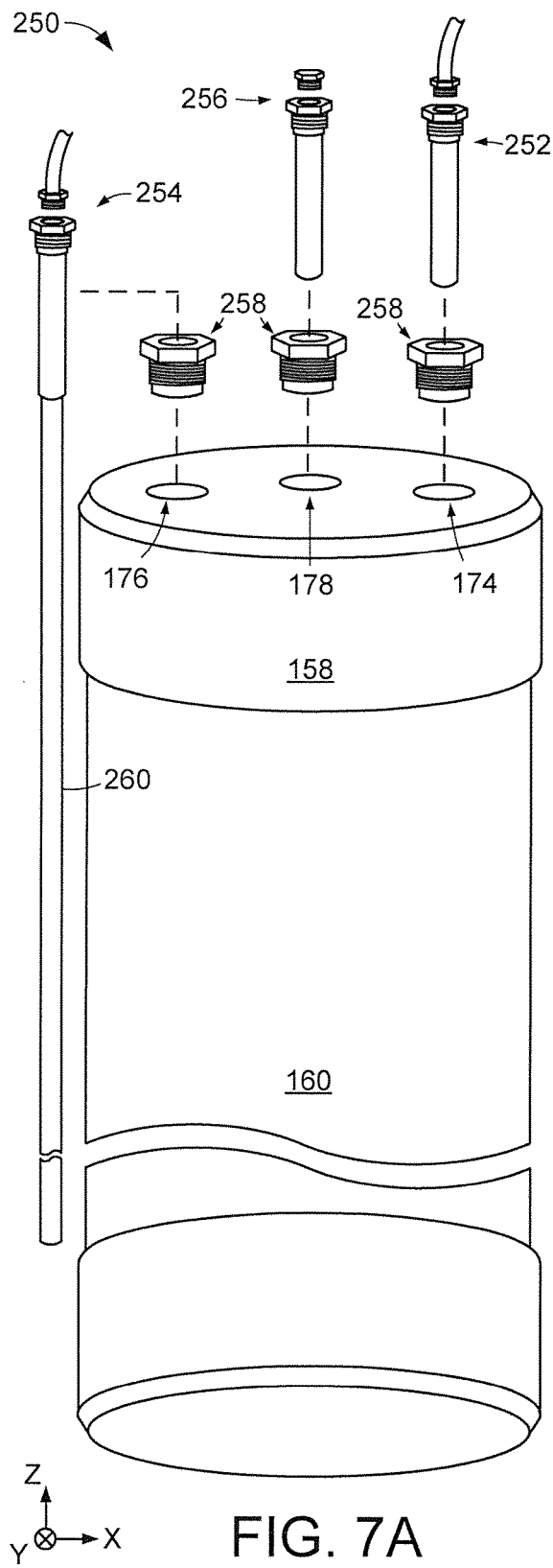
FIGS. 7A and 7B respectively display portions of an example subterranean gas storage assembly configured and operated in accordance with assorted embodiments.
Figure 7B:
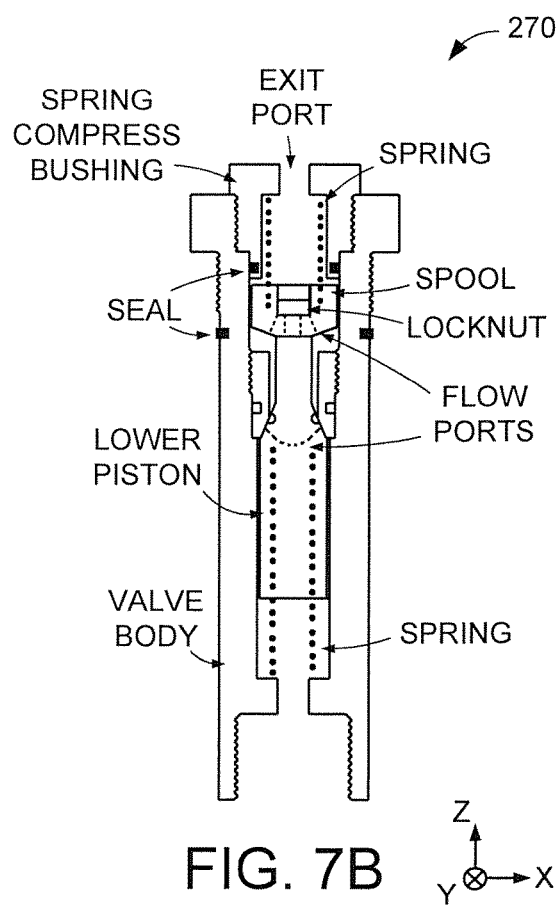

The installation of a gas storage assembly into a bore allows the respective unit vessels to be filled and pressurized with gas hydrocarbons. FIGS. 7A & 7B display portions of an example subterranean gas storage assembly 250 configured in accordance with various embodiments. FIG. 7A shows a partially exploded view of a portion of an example vessel 142 with valves arranged to control the storage of hydrocarbon gas within the vessel. It is noted that the valve configuration of FIG. 7A is exemplary and can be duplicated, or altered, with other vessels in a packaged unit secured in a subterranean bore as part of a gas storage assembly.

An inlet check valve 252 is positioned within the inlet hole 174 while an outlet check valve 254 is positioned within the outlet hole 176 and a plug 256 is positioned within the offset center hole 178. It is noted that each valve 252/254 and plug 256 is integrated into the vessel 142 with a sealing fitting 258 that can comprise any number of metal-to-metal contact surfaces and/or seals. In the non-limiting embodiment of FIG. 7A, each fitting 258 is threaded into the top cap 158 and each valve 252/254 is threaded into the fitting 258. Hence, numerous seals and sealing surfaces can be employed to ensure each vessel hole 174/176/178 is sealed and capable of holding thousands of pounds of pressure over time without leaking.

It is contemplated that the plug 256 is replaced with a valve, meter, or window that contributes to the efficiency and/or safety of the vessel 142. The plug 256 may be replaced with an auxiliary inlet valve 252 or outlet valve 254 to facilitate additional fill, or release, rate. The use of the fitting 258 allows for the configuration of the top cap 158, at will. The outlet valve 254 is configured with an excess flow body 260 that has an extending length, along the Z-axis, and variable internal diameter to mitigate output gas flow from spiking or lacking consistency over time. The flow body 260 is contemplated as a modular component that can be changed by a user depending on the intended use, and safety checks, of the vessel 142.

FIG. 7B conveys a cross-sectional view of an example check valve 270 that can be utilized as an inlet 252 or outlet 254 capacity. In some embodiments, a vessel 142 is hardened with the various valves 252/254 positioned wholly within the vessel 142, which can be facilitated by the valve 270 of FIG. 7B. It is noted the temperature within a vessel 142 will remain constant with the geothermal gradient, any change in pressure within the vessel 142 can only be attributed to upstream compression equipment, such as compressor 104. Consequently, as an improved safety feature unique to subterranean gas storage, one or more redundant pressure relief valves can be positioned upstream of the vessel 142 and set to release well below the pressure rating of the vessel 142. If the pressure relief valve triggers, the inlet check valve(s) 252 will prevent the release of gas from the vessel 142 and the only gas vented will be upstream of the vessel 142.

The construction of the check valve 270 allows for service to be performed in the field without being removed from the vessel 142. That is, the top spring and spool can be removed to reconfigure the check valve 270 as an inlet valve, outlet valve, or pressure relief valve. Manual release of pressure from the vessel 142 can also be facilitated by the check valve 270 by installing a manual release valve body. It is noted that the valve seat can be removed with a special tool. In some embodiments, a 1" pipe extends from the check valve 270 to within an inch of the bottom of the vessel 142, which allows condensed fluids to efficiently be removed.

Figure 8:
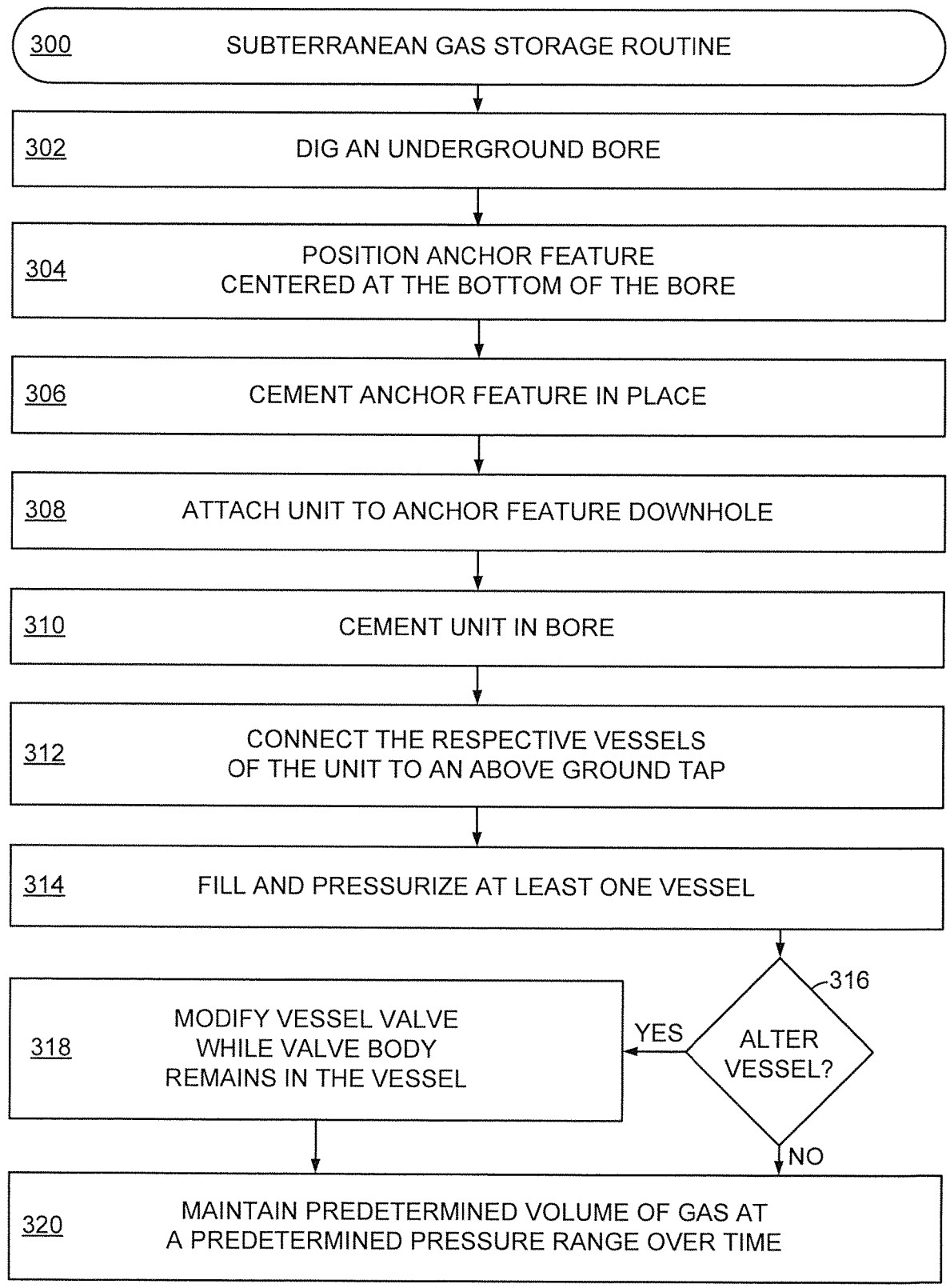
FIG. 8 is an example gas storage assembly installation routine that can be executed with the various embodiments of FIGS. 2-7B.

FIG. 8 is a flowchart of an example subterranean gas storage routine 300 that can be employed to configure and operate a subterranean gas storage assembly in accordance with some embodiments. At a selected location, a single bore is dug in step 302 to a predetermined depth, such as 50-100 feet below ground level. An anchor feature is lowered into the bore in step 304 with the feature self-centering due to at least one bow spring. Step 306 cements the anchor feature in the bore, proximal the bottom floor of the bore. It is noted that step 306 can involve holding the anchor feature in place from above ground, but such arrangement is not required.

With the anchor feature secured downhole, a plurality of vessels packaged together into a unit is lowered and attached to the anchor feature in step 306. Such attachment may be via articulating jaws, threads, and/or keyed connections. The unit, and the respective vessels, is then assembled, oriented, and installed in the bore so that an attachment of the unit and anchor feature can be made. As a result, the unit is centered in the bore due to the anchor feature and ready to receive cement in step 308. It is noted that the unit can have multiple retainers physically contacting the respective unit vessels, which aids in overcoming the buoyancy of the unit and retaining the unit in the bore during step 310. The use of one or more retainers additionally provides resistance to any upward force on the unit over time.

In response to the unit being covered with cement and the bore being substantially filled in step 310, step 312 connects at least one vessel of the unit, or each vessel of the unit, to an above ground tap with interconnection(s), which allow gas to flow to, and from, the respective vessels of the unit. It is contemplated that step 312 involves configuring valves, meters, and/or filters that provide control of vessel inlet and outlet ports.

Next, step 314 fills and pressurizes at least one vessel from an above ground source. The pressurization may be maintained, such as at 4500 psi or more, for any amount of time before decision 316 evaluates if one or more vessels is to be altered. If so, step 318 modifies at least one valve while the valve body remains in the vessel. Such modification of step 318 may change the internal pressure of a vessel, alter inlet rate, alter outlet rate, or add additional gas control equipment to a spare port. At the conclusion of step 318, or if no vessel alteration was called for in decision 316, step 320 maintains a predetermined volume of gas in the vessel (s) of the unit at a predetermined pressure range over time. As such, the compressed gas can be selectively utilized and subsequently replenished to allow efficient distribution and dispensing.

Through the various embodiments of the present disclosure, hydrocarbons, and specifically hydrocarbon gases like natural gas and propane, can be safely stored in large volumes underground. By storing gas in a subterranean bore, an above ground footprint is minimalized and allows gas to be stored at increased pressures more safely than in above ground tanks. The configuration of multiple separate vessels in a single subterranean bore increases safety and allows customized gas storage parameters with reduced installation costs compared to positioning individual vessels in separate underground bores. As a result, gas storage is optimized with the various embodiments of a subterranean gas storage assembly.

What is claimed is:

1. An apparatus comprising a unit secured in a single subterranean bore, the unit comprising a plurality of separate vessels attached via at least one retainer, each vessel of the plurality of separate vessels having at least one cap comprising an inlet hole, an outlet hole, and a center hole, the center hole positioned off center from a radial center of a top surface of the cap, the unit secured in the single subterranean bore by cement continuously extending between the plurality of vessels to surround the unit and contact a sidewall of the subterranean bore.

2. The apparatus of claim 1, wherein each vessel of the plurality of separate vessels comprises a body sealed by a top cap and a bottom cap.

3. The apparatus of claim 2, wherein at least one of the top cap and bottom cap comprises a threaded connection with the body.

4. The apparatus of claim 3, wherein at least one of the top cap and bottom cap comprises an elastomer seal contacting the body.

5. The apparatus of claim 4, wherein at least one of the top cap and bottom cap comprises a metal-to-metal seal proximal the elastomer seal.

6. The apparatus of claim 2, wherein the body extends into a channel of the at least one of the top cap and bottom cap, the channel concurrently contacting opposite sides of the body.

7. The apparatus of claim 6, wherein the body comprises a beveled surface positioned to contact the channel.

8. The apparatus of claim 2, wherein the top cap comprises a port offset from a center of at least one of the top cap and bottom cap, the port aligned with a valve positioned within the body.

9. An assembly comprising a unit secured in a single subterranean bore by an anchor feature, the unit comprising a plurality of separate vessels attached via at least one retainer, the anchor feature comprising a self-centering bowspring, each vessel of the plurality of separate vessels having a cap comprising an inlet hole, an outlet hole, and a center hole, the center hole positioned off center from a radial center of a top surface of the cap, the unit secured in the single subterranean bore by cement continuously extending between the plurality of vessels to surround the unit and contact a sidewall of the subterranean bore.

10. The assembly of claim 9, wherein the self-centering bowspring comprises a plurality of separate plates connected by a plurality of bows.

11. The assembly of claim 10, wherein each bow of the plurality of bows is attached to a hinge, the hinge restricting movement of the bow to an axis parallel to a longitudinal axis of the single subterranean bore.

12. The assembly of claim 10, wherein each plate of the plurality of separate plates has a triangular shape.

13. The assembly of claim 10, wherein a first plate of the plurality of separate plates is secured to an anchor pole, a second plate of the plurality of separate plates is disconnected from the anchor pole.

14. The assembly of claim 13, wherein an anchor plate continuously extends from a floor of the single subterranean bore to the unit through each plate of the plurality of separate plates.

15. The assembly of claim 13, wherein the anchor pole is centered within the single subterranean bore by the self-centering bowspring.

16. The assembly of claim 10, wherein each plate of the plurality of plates has a width that is less than a width of the single subterranean bore.

17. A system comprising a unit secured in a single subterranean bore, the unit comprising a plurality of separate vessels attached via at least one retainer, an anchor attached to the at least one retainer, each vessel of the plurality of separate vessels having a cap comprising an inlet hole filled with an inlet valve, an outlet hole filled with an outlet valve, and a center hole filled with a plug, the center hole positioned off center from a radial center of a top surface of the cap, the unit secured in the single subterranean bore by cement continuously extending between the plurality of vessels to surround the unit and contact a sidewall of the subterranean bore.

18. The system of claim 17, wherein at least one inlet check valve and at least one outlet check valve are each connected to the plurality of separate vessels.

* * * * *